(12) United States Patent
Ando et al.

(10) Patent No.: US 7,674,399 B2
(45) Date of Patent: Mar. 9, 2010

(54) ELECTROLUMINESCENT MATERIAL AND ELECTROLUMINESCENT ELEMENT USING THE SAME

(75) Inventors: Masanori Ando, Ikeda (JP); Akio Yamanaka, Sapporo (JP); Yutaka Kawabe, Chitose (JP); Eiichi Hanamura, Chitose (JP)

(73) Assignees: Japan Science and Technology Agency, Kawaguchi-Shi (JP); National Institute of Advanced Industrial Science and Technology, Tokyo (JP)

( * ) Notice: Subject to any disclaimer, the term of this patent is extended or adjusted under 35 U.S.C. 154(b) by 166 days.

(21) Appl. No.: 10/577,322

(22) PCT Filed: Oct. 28, 2004

(86) PCT No.: PCT/JP2004/016359

§ 371 (c)(1),
(2), (4) Date: Dec. 29, 2006

(87) PCT Pub. No.: WO2005/042669

PCT Pub. Date: May 12, 2005

(65) Prior Publication Data
US 2007/0085470 A1 Apr. 19, 2007

(30) Foreign Application Priority Data
Oct. 30, 2003 (JP) .............................. 2003-370984

(51) Int. Cl.
H05B 33/14 (2006.01)
C09K 11/55 (2006.01)
C09K 11/58 (2006.01)
C09K 11/78 (2006.01)
C09K 11/80 (2006.01)

(52) U.S. Cl. .............................. 252/301.4 R; 313/503; 428/917; 428/690

(58) Field of Classification Search .......... 252/301.4 R; 313/503; 428/917, 690; 423/263, 594.16, 423/595, 599, 600
See application file for complete search history.

(56) References Cited

U.S. PATENT DOCUMENTS

| | | | | |
|---|---|---|---|---|
| 3,226,183 A | * | 12/1965 | Bertaut et al. ................. | 117/78 |
| 3,550,033 A | * | 12/1970 | Mazelsky et al. .............. | 372/41 |
| 3,725,811 A | * | 4/1973 | Murphy ........................ | 372/41 |
| 3,956,170 A | * | 5/1976 | Weber .................... | 252/301.4 R |
| 3,974,108 A | * | 8/1976 | Staut et al. .............. | 252/519.1 |
| 4,988,402 A | * | 1/1991 | Kokta ................... | 252/301.4 R |
| 5,055,436 A | * | 10/1991 | Klemptner et al. .......... | 505/445 |
| 5,057,492 A | * | 10/1991 | Oka et al. ................... | 505/451 |
| 5,096,880 A | * | 3/1992 | Rybka ....................... | 505/400 |
| 5,106,828 A | * | 4/1992 | Bhargava et al. ............ | 505/440 |
| 5,851,507 A | * | 12/1998 | Pirzada et al. .............. | 423/659 |
| 7,016,094 B2 | * | 3/2006 | Awaya et al. ............... | 359/245 |
| 2001/0016554 A1 | * | 8/2001 | Takeuchi .................. | 502/303 |
| 2002/0022568 A1 | * | 2/2002 | Mackay et al. ............. | 501/152 |
| 2002/0034644 A1 | * | 3/2002 | Swiler et al. ............... | 428/432 |
| 2004/0028954 A1 | * | 2/2004 | Arendt et al. ............... | 428/701 |
| 2006/0261329 A1 | * | 11/2006 | Muccini et al. .............. | 257/40 |

FOREIGN PATENT DOCUMENTS

| | | | |
|---|---|---|---|
| JP | 63-225599 | * | 9/1988 |
| JP | 5-132668 | | 5/1993 |
| JP | 7-172995 | | 7/1995 |
| JP | 07-286171 | * | 10/1995 |
| JP | 8-45781 | | 2/1996 |
| JP | 2000-236112 | | 8/2000 |
| JP | 2002-129154 | * | 5/2002 |

OTHER PUBLICATIONS

Translation for JP 2002-129154.*
Kim et al, "The composite picture of the charge carriers in La2-xSrxCuO4 (0.063 <x<0.11) superconductors", J. Phys. :Condens. Matter 15, Nov. 25, 2003, pp. 8485-8494.*
Bourne et al, "Onset of Superconductivity in Y-Ba-Cu-O at 100K", Physics Lett. A, vol. 120, #9, Mar. 1987, pp. 494-496.*
Gruninger et al,"Charged magnons and magneto-elastic polarons in the mid-infrared spectrm of YBa2Cu3O6", Physica C, 317-318, 1999, pp. 286-291.*

(Continued)

Primary Examiner—C. Melissa Koslow
(74) Attorney, Agent, or Firm—Kratz, Quintos & Hanson, LLP (57) ABSTRACT

The present invention provides electroluminescent materials that emit very bright light with little energy consumption, little loss of energy converted into heat, etc., and suffers from little deterioration due to long-term use, in particular, inorganic electroluminescent materials that emit blue to green light having a wavelength shorter than yellow.

Specifically, the present invention relates to the following three types of electroluminescent material:
(1) An electroluminescent material including an oxide having a perovskite-type crystal structure represented by General Formula $RMO_3$, wherein R is at least one rare-earth element, and M is at least one member selected from the group consisting of Al, Mn, and Cr;
(2) an electroluminescent material including an oxide having a perovskite-type crystal structure represented by General Formula $R_2CuO_4$, wherein R is at least one rare-earth element; and
(3) an electroluminescent material including an oxide having a perovskite-type crystal structure represented by General Formula $RZ_2Cu_3O_6$, wherein R is at least one rare-earth element, and Z is at least one alkali-earth metal.

11 Claims, 4 Drawing Sheets

OTHER PUBLICATIONS

Lin et al, "Peculiar hole doping by Ca substitution in cuprate superconductors", Jorn. Low Temp. Physics, vol. 131, No. 3/4, /2003, pp. 337-341.*

Janossy et al, "Diagonal Antiferromagnetic Easy Axis in Lightly Hole Hoped Y1-xCaxBa2Cu3O6", Physical Review Letters, vol. 91, No. 17, Oct. 24, 2003, 177001-1 to 177001-4.*

Trigger, vol. 18, No. 3 (1999); pp. 21-23—partial translation; see specification pp. 1-2.

E. Arisi et al.; "Organic Light Emitting Diodes with Spin Polarized Electrodes"; Journal of Applied Physics, American Institute of Physics, New York, US; vol. 93, No. 10, May 15, 2003; pp. 7682-7683; XP012058257.

S.A. Basun et al.; "Optical and Photoelectrical Studies of Charge-Transfer Processes in $YAlO_3$: Ti Crystals"; Physical Review B; vol. 54; No. 9; Sep. 1, 1996; pp. 6141-6149; XP002488359.

Supplementary Partial European Search Report dated Aug. 8, 2008.

* cited by examiner

ELECTROLUMINESCENT MATERIAL AND ELECTROLUMINESCENT ELEMENT USING THE SAME

TECHNICAL FIELD

The present invention relates to electroluminescent materials and electroluminescent elements using the same.

BACKGROUND OF THE INVENTION

Currently used electroluminescent materials and electroluminescent elements using the same can be roughly classified into two groups, i.e., inorganic materials and organic materials. Inorganic electroluminescent materials are superior to organic electroluminescent materials in long-term stability, and emit light even under high temperatures or other severe conditions. Therefore, further research and development of inorganic electroluminescent materials are sough.

As disclosed in *Trigger*, vol. 18, No. 3 (1999): pp. 21-23, among inorganic electroluminescent materials, only a material using an electroluminescent layer formed from ZnS to which Mn is doped as an impurity (dopant) has been put into practical use. However, such an electroluminescent material emits only light with a specific wavelength, in particular yellow light, and therefore emission of non-yellow light using electroluminescence has not yet been achieved.

Emission wavelength in electroluminescence is determined by the electronic state specific to the electroluminescent material used. Therefore, in order to emit light other than yellow light, development of electroluminescent materials other than Mn-doped ZnS is required. Currently, research and development of electroluminescent materials that emit red light having a wavelength longer than yellow light, and blue, green or other light having a wavelength shorter than yellow light have not been progressed satisfactorily. With this being the situation, the development of electroluminescent materials that emit high-luminance light with little energy consumption, have little energy loss due to conversion to heat, etc., suffer from little deterioration even after long-time usage, and, in particular, inorganic electroluminescent materials that emit blue, green or other light having a wavelength shorter than that of yellow light have been awaited.

SUMMARY OF THE INVENTION

An object of the present invention is to provide an electroluminescent material that emits high-luminance light with little energy consumption, has little energy loss due to conversion to heat, etc., suffers from little deterioration even if used for a long time period, and, in particular, an inorganic electroluminescent material that emits blue, green or other light having a wavelength shorter than that of yellow light.

In order to achieve the above object, the present inventors conducted extensive research and found that the object can be achieved by an electroluminescent material formed from a specific oxide (oxide electroluminescent material) having a perovskite-type crystal structure, and thus the present invention has been accomplished.

In other words, the present invention provides the following electroluminescent materials and electroluminescent elements using the same.

1. An electroluminescent material including an oxide having a perovskite-type crystal structure represented by General Formula $RMO_3$, wherein R represents at least one rare-earth element, and M represents Al, Mn or Cr.

2. An electroluminescent material including an oxide having a perovskite-type crystal structure represented by General Formula $R_2CuO_4$, wherein R represents at least one rare-earth element.

3. An electroluminescent material including an oxide having a perovskite-type crystal structure represented by General Formula $RZ_2Cu_3O_6$ wherein R represents at least one rare-earth element, and Z represents at least one alkaline earth metal.

4. An electroluminescent material according to any one of Items 1 to 3, wherein the oxide further includes at least one dopant selected from the group consisting of alkaline earth metals, Mg, alkali metals, and transition metals.

5. An electroluminescent material according to any one of Items 1 to 4, wherein the rare-earth element R is at least one member selected from the group consisting of Sc, Y, La, Ce, Pr, Nd, Sm, Eu, Gd, Tb, Dy, Ho, Er, Tm, Yb, and Lu.

6. An electroluminescent material according to Item 3 or 4, wherein the alkaline earth metal is at least one member selected from the group consisting of Ca, Sr, and Ba.

7. An electroluminescent material according to Item 4, wherein the dopant is Mg.

8. An electroluminescent material according to Item 4, wherein the alkali metal is at least one member selected from the group consisting of Li, Na, K, Rb, and Cs.

9. An electroluminescent material according to Item 4, wherein the transition metal is at least one member selected from the group consisting of Ti, V, Cr, Mn, Fe, Co, Ni, Cu, and Zn.

10. An electroluminescent material according to Item 4, wherein the proportion of the alkaline earth metal dopant contained in the oxide (mole % of alkaline earth metal(s) added as dopant(s) relative to M or Cu) is 0.001 to 10%.

11. An electroluminescent material according to Item 4, wherein the proportion of the Mg dopant contained in the oxide (mole % of Mg added as dopant relative to M or Cu) is 0.001 to 10%.

12. An electroluminescent material according to Item 4, wherein the proportion of the alkali metal dopant contained in the oxide (mole % of alkali metal added as dopant relative to M or Cu) is 0.001 to 10%.

13. An electroluminescent material according to Item 4, wherein the proportion of the transition metal dopant contained in the oxide (mole % of transition metal added as dopant relative to M or Cu) is 0.001 to 10%.

14. An electroluminescent element having an electroluminescent layer formed from an oxide electroluminescent material of any one of Items 1 to 13.

15. An electroluminescent element according to Item 14, wherein the electroluminescent layer is formed from a single-crystalline oxide thin film.

16. An electroluminescent element according to Item 14, wherein the electroluminescent layer is formed from a polycrystalline oxide thin film.

17. An electroluminescent element according to Item 14, wherein the electroluminescent layer is obtained by the compression molding of oxide fine particles, or by forming a paste containing oxide fine particles into a layer and then drying.

18. An electroluminescent element according to Item 14, wherein the electroluminescent layer is obtained by the compression molding of a mixture of oxide fine particles and a binder, or by forming a paste containing a mixture of oxide fine particles and a binder into a layer and then drying.

19. An electroluminescent element according to Item 14, wherein the electroluminescent layer is formed by sputtering.

20. An electroluminescent element according to Item 14, wherein the electroluminescent layer is formed by laser ablation.

21. An electroluminescent element according to Item 14, wherein the electroluminescent layer is formed by metal salt thermal decomposition.

22. An electroluminescent element according to Item 14, wherein the electroluminescent layer is formed by metal complex thermal decomposition.

23. An electroluminescent element according to Item 14, wherein the electroluminescent layer is formed by a sol-gel process using an alkoxide.

24. An electroluminescent element according to Item 14, wherein the electroluminescent element further having a light reflection layer.

Hereunder, the electroluminescent material of the present invention and the electroluminescent element using the same are explained below in detail.

Electroluminescent Material

An electroluminescent material of the present invention is represented by one of the following three General Formulae:

(1) an electroluminescent material including an oxide having a perovskite-type crystal structure represented by General Formula $RMO_3$, wherein R is at least one rare-earth element, and M is at least one member selected from the group consisting of Al, Mn, and Cr;

(2) an electroluminescent material including an oxide having a perovskite-type crystal structure represented by General Formula $R_2CuO_4$, wherein R is at least one rare-earth element; and (3) an electroluminescent material including an oxide having a perovskite-type crystal structure represented by General Formula $RZ_2Cu_3O_6$, wherein R is at least one rare-earth element, and Z is at least one alkaline earth metal.

Examples of usable rare-earth elements R include Sc, Y, La, Ce, Pr, Nd, Sm, Eu, Gd, Tb, Dy, Ho, Er, Tm, Yb, Lu, etc. Among these, Y, La, Nd, and Sm are particularly preferable.

Examples of usable alkaline earth metals Z include Ca, Sr, Ba, etc. Among these, Ca and Sr are particularly preferable.

The oxide, which is a constituent component of the electroluminescent material of the present invention, may further include at least one member selected from the group consisting of alkaline earth metals, Mg, alkali metals, and transition metals as an added impurity (dopant). Hereunder, added impurity means "dopant". By doping with an impurity, oxygen defects that serve as the luminescence centers in the oxide are stabilized.

The preferable mode for doping is replacing some of the rare-earth element(s) R in the oxide having a perovskite-type crystal structure with dopant(s). For example, when Ca or Mg is doped into $YAlO_3$ or $LaAlO_3$, it is preferable that some of the trivalent Y or La in the $YAlO_3$ or $LaAlO_3$ crystal lattice are substituted with divalent Ca or Mg.

The alkaline earth metals Z exemplified above can also be used as alkaline earth metal dopants.

Li, Na, K, Rb, Cs, etc., are examples of alkali metals usable as dopants. Among these, Li, Na, and K are particularly preferable.

Ti, V, Cr, Mn, Fe, Co, Ni, Cu, Zn, etc., are examples of transition metals usable as dopant. Among these, Ti, Mn, Fe, and Cu are particularly preferable.

Among the above-mentioned dopants, Ca, Sr, Mg, and Ti are preferable, and Mg is particularly preferable. Dopants may be used singly or in combination.

The content of alkaline earth metal dopant in the oxide (i.e., mole % of alkaline earth metal(s) added as dopant(s) relative to M or Cu) is generally 0.001 to 10%, preferably 0.005 to 5%, and more preferably about 0.01% to about 2%.

The content of Mg dopant in the oxide (i.e., mole % of Mg added as dopant relative to M or Cu) is generally about 0.001 to about 10%, preferably about 0.005 to about 5%, and more preferably about 0.01 to about 2%.

The content of alkali metal dopant in the oxide (i.e., mole % of alkali metal(s) added as dopant(s) relative to M or Cu) is generally about 0.001 to about 10%, preferably about 0.005 to about 5%, and more preferably about 0.01 to about 2%.

The content of transition metal dopant in the oxide (i.e., mole % of transition metal(s) added as dopant(s) relative to M or Cu) is generally about 0.001 to about 10%, preferably about 0.005 to about 5%, and more preferably about 0.01 to about 2%.

Examples of electroluminescent materials of the present invention, and in particular examples of oxides represented by General Formula $RMO_3$, include $YAlO_3$ (yttrium aluminate), $LaAlO_3$ (lanthanum aluminate), etc. Specific examples of oxides containing Ti or Ca as preferable dopant include Ti- or Ca-doped $YAlO_3$, Ti- or Ca-doped $LaAlO_3$, etc. Examples of oxides represented by General Formula $R_2CuO_4$ include $La_2CuO_4$, $Nd_2CuO_4$, $Y_2CuO_4$, etc. Examples of the oxides represented by General Formula $RZ_2Cu_3O_6$ include $YBa_2Cu_3O_6$, $LaSr_2Cu_3O_6$, $LaCa_2Cu_3O_6$, etc.

The oxide having a perovskite-type crystal structure that is a component of the electroluminescent material of the present invention may have monocrystalline or polycrystalline crystal system and may be amorphous. The method for synthesizing the oxide is not limited. For example, monocrystalline oxide may be synthesized by a floating zone melting method (hereunder referred to as an FZ method). Polycrystalline or amorphous oxide may be synthesized by sintering, sputtering, laser ablation, metal salt thermal decomposition, metal complex thermal decomposition, a so-gel process using alkoxide as a material, etc. Such synthetic methods are explained below in detail.

Electroluminescent Element

The electroluminescent element of the present invention has an electroluminescent layer formed from an oxide electroluminescent material of the present invention. The constituent components thereof other than the electroluminescent layer may be the same as those of known electroluminescent elements. For example, various materials that are used for known electroluminescent elements, such as metallic materials, semiconductor materials, etc., can be used for the upper electrode and the lower electrode of the present invention.

Specific examples of an electroluminescent element of the present invention are as follows:

1) an electroluminescent element having a lower electrode, an electroluminescent layer, and an upper electrode sequentially laminated;

2) an electroluminescent element having a lower electrode, (optionally, an insulating layer or stabilizing resistive layer. an electroluminescent layer, and an upper electrode sequentially laminated;

3) an electroluminescent element having an electroluminescent layer and a transparent electrode (upper electrode) sequentially laminated on a transparent electrode (lower electrode) formed on a glass substrate;

4) an electroluminescent element having a structure wherein a lower electrode is formed on a substrate formed from plastic, ceramic, etc., with an electroluminescent layer and a transparent electrode (upper electrode) sequentially laminated on the lower electrode; etc.

It is preferable that the upper electrode be formed from a transparent or translucent material, or have a comb-like shape, wherein light emitted from the electroluminescent layer can be emitted from the element.

In Item 3), there are no limitations on the number of electroluminescent layers and transparent electrodes laminated; however, generally 2 to 10 sets of the electroluminescent and transparent electrode layers are laminated.

When the electroluminescent element is driven by applying alternating current, an insulating layer is provided in case the electrical conductivity of the electroluminescent layer is too great to apply satisfactorily high voltage to the electroluminescent layer, electric breakdown may occur due to excessive current, etc. Specifically, an insulating layer is sandwiched between at least one of the pairs of electroluminescent layer and upper electrode, and electroluminescent layer and lower electrode.

There are no limitations on the materials for the insulating layer as long as they are electrically non-conductive. $SiO_2$, $SiON$, $Al_2O_3$, $Si_3N_4$, $SiAlON$, $Y_2O_3$, $BaTiO_3$, $Sm_2O_3$, $Ta_2O_5$, $BaTa_2O_6$, $PbNb_2O_6$, $Sr(Zr,Ti)O_3$, $SrTiO_3$, $PbTiO_3$, $HfO_3$, etc., are examples of usable materials. It is also possible to use insulating ceramics and the like that combine two or more such materials.

It is preferable that the insulating layer be as thin as possible within the range that electric non-conductance can be obtained. When the insulating layer is too thick, the distance between the upper electrode and the lower electrode is unduly large. This diminishes the electric field strength applied to the electroluminescent layer and may reduce the luminous efficiency. The thickness of the insulating layer is generally about 50 to 800 nm, and preferably about 100 to 400 nm.

When the electroluminescent element is driven by applying direct current, a stabilizing resistive layer is provided if the electrical conductivity of the electroluminescent layer is too great to supply a satisfactorily high voltage to the electroluminescent layer, electric breakdown may occur due to excessive current, etc. Specifically, a stabilizing resistive layer is sandwiched between at least one of the pairs of electroluminescent layer and upper electrode, and electroluminescent layer and lower electrode.

There are no limitations on the materials for the stabilizing resistive layer as long as they can increase the electric resistance. Typical materials are those having a composition similar to that of the electroluminescent layer but whose electrical conductivity is made lower than that of the electroluminescent layer by changing the dopant concentration.

For example, when (electrical conductive) Ti-doped $YAlO_3$ is used as an electroluminescent layer, (insulating) $YAlO_3$ without doping of Ti can be used as a stabilizing resistive layer.

It is preferable that the stabilizing resistive layer be as thin as possible within the range that an effect for increasing the electrical resistance can be obtained. When the stabilizing resistive layer is too thick, the distance between the upper electrode and the lower electrode is unduly great. This diminishes the electric field strength applied to the electroluminescent layer and may reduce the luminous efficacy. The thickness of the stabilizing resistive layer is generally about 50 to 800 nm, and preferably about 100 to 400 nm.

The structures of the upper electrode and the lower electrode used in the case where electroluminescence is generated by applying a direct voltage are explained below in detail. Of the two electrodes, one is an anode, and the other is a cathode.

Electrode materials having a large work function, such as gold, platinum and the like metals, and indium-tin oxide (ITO) and the like transparent metal oxides are preferable as materials for the anode. Electrode materials having a small work function, such as calcium, sodium, magnesium, aluminum and the like metals are preferably used for the cathode. Magnesium can inhibit oxidization in air and enhance adhesion with the electroluminescent layer when used as an electrical material after being subjected to dual-source vapor deposition or the like with silver or indium and formed into an alloy or a mixture of metals. From the viewpoint of long-term stability, aluminum is the most practical, since it is much less oxidized by air than calcium, sodium, or magnesium.

The upper electrode and the lower electrode used when electroluminescence is generated by applying alternating voltage may be the same as when electroluminescence is generated by applying direct voltage. It is also possible to select an electrode made of a single material selected from the above-mentioned various electrode materials for direct current electroluminescence, and use such a kind of electrode for both the upper and lower electrodes.

Based on the above-described known basic structure, the structure of the electroluminescent element may be variously modified to those applicable to display panels and the like by using known methods.

For example, the structure of the electroluminescent element may be modified as follows: 1) a light-emitting site in the light emitting plane can be structured as an assembly of fine dots, with groups each consisting of three dots, i.e., a blue-light-emitting dot, a green-light-emitting dot, and a red-light-emitting dot, being disposed on a plane of the light emitting element, so that various luminescent colors and luminescent patterns can be obtained by making specific dots emit light; 2) light-emitting sites are laminated in a single dot in a light emitting plane, and groups each consisting of three layers, i.e., a blue-light-emitting layer, a green-light-emitting layer, and a red-light-emitting layer, are disposed on a plane of a light emitting element, so that various luminescent colors and luminescent patterns can be obtained by making a specific dot in a specific layer emit light; and 3) In the light emitting plane, the light-emitting site can be structured as an assembly of fine dots of monochrome luminous body, with groups each consisting of three dots, i.e., a blue-light-emitting dot, a green-light-emitting dot, and a red-light-emitting dot, which are obtained by attaching a color filter on the surface of each dot, being disposed on a plane of the light emitting element, so that various luminescent colors and luminescent patterns can be obtained by making specific dots emit light.

An electroluminescent layer formed from the electroluminescent material of the present invention can be obtained by, for example, compression molding fine particles of oxide electroluminescent material, or forming a paste containing fine particles of oxide electroluminescent material into a layer and then drying.

Specifically, oxide single crystals having a perovskite structure can be obtained by placing in a furnace a sintered body or powder of various oxides that are usable as materials for the perovskite oxide that will form the electroluminescent material of the present invention, and subjecting it to an FZ (floating zone) method using a xenon lamp, halogen lamp or the other known heating means. For example, when the FZ method is employed, $YAlO_3$ single crystals can be obtained by heating a sintered body of a mixture of $Y_2O_3$ powder and $Al_2O_3$ powder in a furnace equipped with an infrared heater. An electroluminescent layer containing dopants (Ti, Ca, etc.) can be obtained by adding a compound comprising Ti, Ca, etc., to the material beforehand.

The electroluminescent layer can be obtained by pulverizing the thus-obtained oxide single crystals into an oxide powder having an average particle diameter of about 1 to about 5 µm and subjecting the powder to compression molding, or by forming a paste containing the oxide fine particles into a layer and then drying. In preparing a paste, toluene, alcohols and other organic solvents, water, etc., can be used as a liquid component thereof.

It is also possible to enhance the adhesiveness between the fine particles by adding a binder to the oxide fine particles. Examples of usable binders include polymethyl methacrylate, polycarbonates, polyvinyl alcohols, polystyrene, polyethylene and the like transparent resins; and KBr and the like inorganic solids. It is preferable that such binders be formed into a powder having almost the same diameter as the oxide fine particles. When a mixture containing a binder is formed into a paste, any liquids can be used as a liquid component thereof as long as they can solve or disperse the binder. Such liquid components may be suitably selected depending on the type of the binder; however, they are generally selected from toluene, alcohols and like organic solvents; water; etc.

It is also possible to obtain an electroluminescent layer by forming the oxide single crystals obtained by the FZ method into a thin film by cutting and/or abrading the crystals using a known method, and disposing the resulting thin film on the lower electrode (if necessary, via an insulating layer or a stabilizing resistive layer). By this method, an excellent and extremely highly purified (i.e., having the highest possible degree of electroluminescence efficiency, and the smallest loss of emitted light caused by scattering, etc.) single crystalline electroluminescent layer can be obtained.

Furthermore, when the electroluminescent layer is formed by subjecting a perovskite oxide obtained by sintering to pulverization and compression molding, etc., an electroluminescent layer with little impurities can be obtained by a simple process. Specifically, a perovskite polycrystalline oxide can be synthesized by preparing oxides that contain constituent components of the object oxide electroluminescent material, mixing these oxides in such a manner that their compounding ratio corresponds to that of the object, and sintering the mixture. Subsequently, the sintered body is pulverized to have a particle diameter of about 1 to about 5 µm, obtaining oxide powder.

There are no limitations on the synthesizing (sintering) conditions, and sintering may be conducted at about 600 to about 1100° C. under an oxidizing atmosphere, such as air which contains oxygen, a reducing atmosphere containing hydrogen, etc. The sintering time is not limited and may be suitably selected depending on the type of material, sintering temperature, etc.; however, the sintering time is generally about 0.5 to about 24 hours, and preferably about 1 to about 12 hours. For example, in a sintering method, polycrystalline $YAlO_3$ can be obtained by mixing $Y_2O_3$ powder and $Al_2O_3$ powder, and then sintering the mixture. An electroluminescent layer containing dopants (Ti, Ca, etc.) can be obtained by adding a compound comprising Ti, Ca, etc., to the material beforehand.

Besides the above-explained methods, it is also possible to obtain an electroluminescent layer by, for example, sputtering, laser ablation, metal salt thermal decomposition, metal complex thermal decomposition, a sol-gel process using an alkoxide, molecular beam epitaxy (MBE), vacuum deposition, physical vapor deposition (PVD), chemical vapor deposition (CVD), etc.

Among the above-mentioned methods, thermal decomposition of a metal salt or a metal complex is a method wherein a perovskite oxide layer is obtained by preparing materials that contain metal components that form the object perovskite oxide, such as carboxylic acid salts, nitric acid salts, fatty acid salts, chelates, diketones, acetylacetonato complexes, etc., mixing the material compounds in such a manner that their compounding ratio corresponds to that of the object oxide, applying the mixture on the lower electrode (if necessary, via an insulating layer or a stabilizing resistive layer) by spin coating, dip coating, spray coating or other various known method, and decomposing it under an atmosphere containing oxygen, such as air. In particular, a method using a metal salt of carboxylic acid or a metal salt of fatty acid (metallic soap) is a known method for organometallic decomposition. An object perovskite oxide layer can be formed in a simple manner at low cost by applying a solution prepared by dissolving the thus-obtained material in a solvent on a substrate, and thermally decomposing and sintering at a temperature not lower than about 300° C. under an oxygen-containing atmosphere, such as air.

Even when other methods are employed, an object perovskite oxide layer (electroluminescent material layer) can also be formed under known conditions. For example, when sputtering, laser ablation, molecular beam epitaxy (MBE), vacuum deposition, physical vapor deposition (PVD), or chemical vapor deposition (CVD) is employed, an electroluminescent layer can be obtained in a routine manner by using oxide single crystals or polycrystals obtained by the above-mentioned FZ method, sintering or the like.

There are no limitations on the thickness of the electroluminescent layer; however, it is generally about 0.005 to about 0.5 mm, and preferably about 0.01 to about 0.1 mm. An unduly thin electroluminescent layer results in too little light being emitted by application of voltage, and this may make it difficult to obtain a high-luminance electroluminescent element. An unduly thick electroluminescent layer results in an increase in the voltage necessary to obtain an electric field strong enough to generate electroluminescence, and this may result in the need of a large, complicated, and expensive electric power unit.

The electrical conductivity of the electroluminescent layer is preferably in the range about $10^{-6}$ to about $10^2$ S/cm, and more preferably in the range about $10^{-5}$ to about 10 S/cm. If the electrical conductivity of the electroluminescent layer is too small, it is difficult to implant electrons and positive holes in the electroluminescent layer by applying voltage, increasing the level of electric field strength necessary. This makes the voltage necessary to generate the electroluminescence unduly large, and requires a large, complicated, and expensive electric power unit. If the electroluminescent layer has an unduly large electrical conductivity, it is difficult to generate an electric field strong enough to obtain electroluminescence when voltage is applied.

Doping is also effective for controlling electrical conductivity. For example, $YAlO_3$ is almost insulating when undoped, i.e., free from dopants, or doped with about 0.1% calcium, and therefore it may be difficult to implant electrons and positive holes therein even when a voltage is applied through an electrode attached thereto. In contrast, since $YAlO_3$ functions as a semiconductor having a specific electrical conductivity when doped with about 0.1 to about 3% titanium, electrons and positive holes can be implanted therein by applying a voltage through an electrode attached thereto, easily generating electroluminescence.

Furthermore, in the electroluminescent layer, the directional relationship between the crystal planes of the perovskite oxide and the voltage applied is not limited; however, in the perovskite oxides represented by $R_2CuO_4$ and $RZ_2Cu_3O_6$, it is preferable that the ac-plane ($CuO_2$ plane) in the perovskite oxide be oriented in the thickness direction of the film, in order to effectively form excitons from the electrons and positive holes and generate light emission from the excitons. An electroluminescent layer having such a structure can be obtained by forming an oxide layer by a molecular beam epitaxy (MBE) method and then subjecting the resultant oxide layer to a thermal treatment. It is also possible to form an electroluminescent layer by attaching oxide single crystals having a perovskite structure to a lower electrode and abrading the surface of the oxide by ion milling.

In the electroluminescent element of the present invention, it is preferable that a light reflection layer be provided. It is particularly preferable that a light reflection layer be provided at the lower electrode side of the electroluminescent layer. When the lower electrode is formed from a transparent electrode, the light reflection layer may be disposed between the lower electrode and the substrate. By providing a light reflection layer, it is possible to apply directivity in a specific direction to the generated light when it is emitted from the electroluminescent element, and therefore the intensity and brightness of the light can be enhanced in that direction. Instead of providing an additional light reflection layer, it is also possible to make the lower electrode itself as a metal electrode (e.g., aluminum, silver, gold, etc.) having a high light reflectance or an electrode having a high refractive index. When the electrode is transparent or has a comb-like shape, an aluminum layer, a silver layer, a gold layer, a transparent layer having a high light reflectance, etc., can be used as a light reflection layer. In order to reflect light efficiently, the thickness of the light reflection layer is preferably not less than 100 nm, and more preferably not less than 200 nm.

An electroluminescent layer having the above-described structure can generate electroluminescence in a highly efficient manner by implanting electrons and positive holes while applying voltage. The reasons for this are presumably the following:

The perovskite oxide used in the present invention is a material having a so-called strongly correlated electron system, and the electrons and positive holes therein tend to have a great mobility, do not readily annihilate, and can move a long distance. Such a perovskite oxide tends to have extremely great oscillator strength in the visible light range, and the electrical conductivity thereof can be enhanced by doping with a very small amount of dopant. The perovskite oxide achieves very strong luminescence (fluorescence) when irradiated with ultraviolet-rays. Such luminescence is caused by color centers due to oxygen defects in the crystal lattice of the perovskite oxide rather than interband transitions occurring at a band-edge of the perovskite oxide. Such oxygen defects occur in a perovskite oxide of the present invention synthesized by the FZ method, etc., while irradiating ultraviolet rays under a reducing atmosphere. When such a perovskite oxide is irradiated with ultraviolet rays, highly intensive fluorescence is observed due to electronic excitation from the color center formed by oxygen defects to a conductive band. The wavelength of the fluorescence (i.e., color) is peculiar to the type of the perovskite oxide and can be altered by appropriately selecting the rare-earth element. If at least one metal selected from the group consisting of alkaline earth metals, Mg, alkali metals, and transition metals is doped in the perovskite oxide while synthesizing it in such an amount that the crystal lattice is not fractured, remarkably intense fluorescence can be generated compared to an undoped perovskite oxide. The fluorescence lifetime is as short as about 15 ns, and the fluorescence quantum yield is as high as 45%. It is presumed that this is because the above-mentioned dopants stabilize the oxygen defects that constitute the color centers. When the size of the dopant is not very large, the emission wavelength is not strongly affected by the type of dopant. However, when the dopant is relatively large, distortion occurs in the crystal lattice of the perovskite oxide, and the emission wavelength thereof is shifted. It is therefore also possible to control the emission wavelength using such an effect.

When voltage is applied to such a fluorescent perovskite oxide, carriers (i.e., electrons and positive holes) tend to have a great mobility and do not readily annihilate. This makes carries accelerated by the applied voltage collide with the color centers, and electroluminescence is generated by a process somewhat similar to which generates fluorescence. Alternatively, luminescence from excitons formed of an implanted electron and positive hole pair (i.e., luminescence occurs when electrons and positive holes are recombined) occurs in an efficient manner when voltage is applied. This enables the fluorescent perovskite oxide to function as a highly effective electroluminescent material.

The above-explained perovskite oxide meets the demand for highly efficient electroluminescence that emits green to blue light, since, as described above, it can achieve highly efficient electroluminescence attributable to the high mobility of electrons and positive holes, which is a distinctive feature of strongly correlated electron systems. Furthermore, the wavelength of the electroluminescence is easily controlled because of the great flexibility in selecting constituent elements of the perovskite oxide, and type and concentration of the dopant(s). Moreover, the materials for the perovskite oxide themselves are inorganic oxides, which are more thermally and chemically stable than organic materials and compound semiconductor materials, and therefore the perovskite oxide can also meet the demand for electroluminescent materials having excellent long-term stability. Because the perovskite oxide can be easily obtained in a simple manner using inexpensive and low toxic materials, it can be said that the perovskite oxide is an environmentally friendly and very safe electroluminescent material.

EFFECT OF THE INVENTION

The electroluminescent material of the present invention is formed from a specific oxide having a perovskite-type crystal structure, and can emit, in addition to yellow light, green light having a shorter wavelength than yellow light. Furthermore, because the electrons and positive holes therein have a great mobility when voltage is applied, and the fluorescence lifetime thereof is very short, electrical energy can be efficiently converted into light energy in the electroluminescent material of the present invention.

Furthermore, the electroluminescent material of the present invention exhibits excellent long-term stability because the constituents thereof have little optical absorption and suffer from little loss of energy caused by re-absorption of the electroluminescence into the material. The electroluminescent material of the present invention is an inorganic electroluminescent material, which is more thermally and chemically stable than organic electroluminescent materials.

An oxide having a perovskite-type crystal structure can be produced at low cost, since an oxide having a satisfactorily low impurity content can be obtained by a relatively simple method, such as sintering in air, an FZ method, etc. In particular, oxide single crystals with remarkably little impurities can be obtained by the FZ method. Oxides obtained by such methods are thermally and chemically stable in air, have a high mechanical strength, and suffer little deterioration due to long-term use.

BEST MODE FOR CARRYING OUT THE INVENTION

The present invention is explained in more detail below with reference to Examples and Comparative Examples. However, the scope of the present invention is not limited to these Examples.

Example 1

Figure 1:
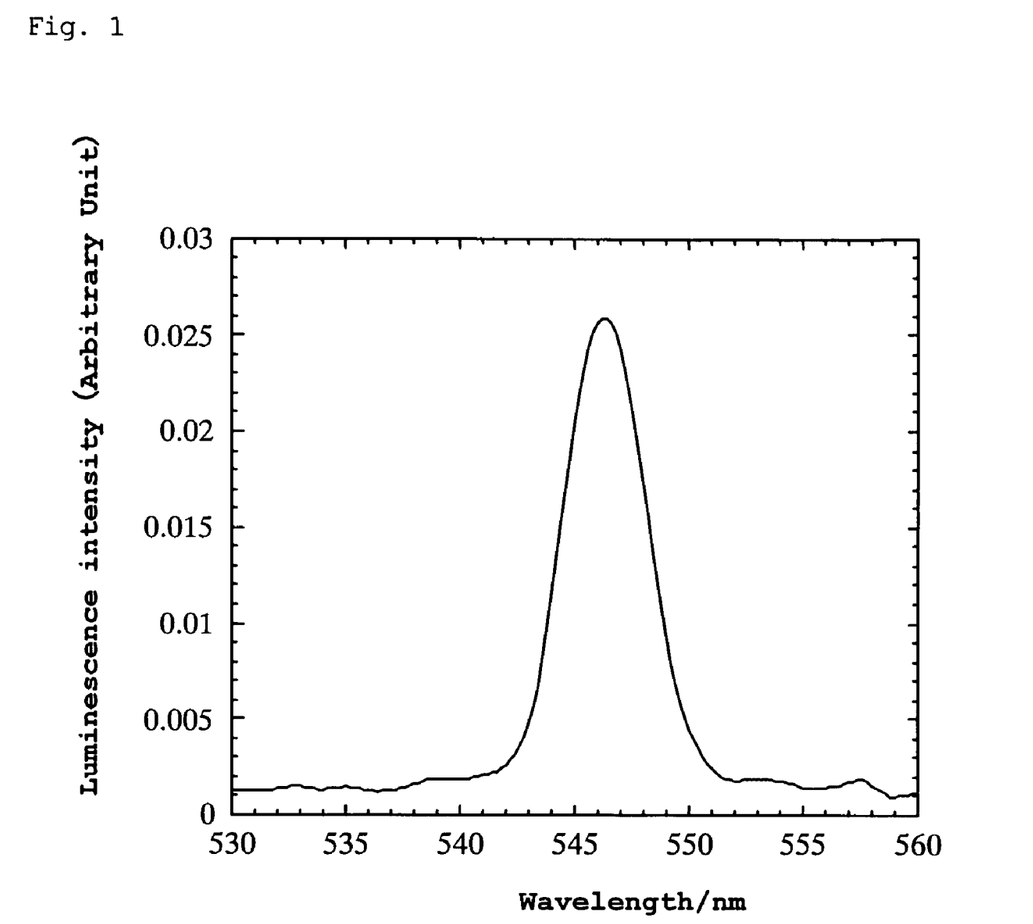
FIG. 1 is a graph showing wavelength characteristics of light emitted from a thin plate prepared in Example 1 of the present invention with an applied bipolar AC voltage having a frequency of 10 Hz, and a voltage of ±950 V.

A thin plate having a diameter of about 2.0 mm and a thickness of about 0.245 mm was prepared by cutting and abrading a 0.1% (mole % of Ca relative to Al) calcium-doped $YAlO_3$ single crystal (translucent white with very light purple) obtained by an FZ method.

An aluminum electrode layer (cathode) having a thickness of 150 nm was formed on one entire surface of the thin plate by a vacuum deposition method. A semicircular gold electrode layer (anode) having a thickness of 75 nm was formed on half of the other surface of the thin plate by a DC sputtering method.

A platinum wire was attached to the thin plate using silver paste and bipolar high AC voltage was applied thereto. When the AC voltage was varied at a frequency of 10 Hz, green luminescence was generated in the range of ±750 to 950 V. The wavelength at the luminescence peak was 546 nm. (However, even with varying the frequency over the range from 2 to 700 Hz, luminescence was not observed at ±500 V.) Luminescence was also observed when high direct current voltage, such as not less than 1500 V, was applied.

Luminescence in the visible wavelength range can be also obtained by using a $La_2CuO_4$ thin plate or $YBa_2Cu_3O_6$ thin plate prepared by employing a metal salt thermal decomposition method instead of a calcium-doped $YAlO_3$ single crystal thin plate.

Example 2

Figure 2:
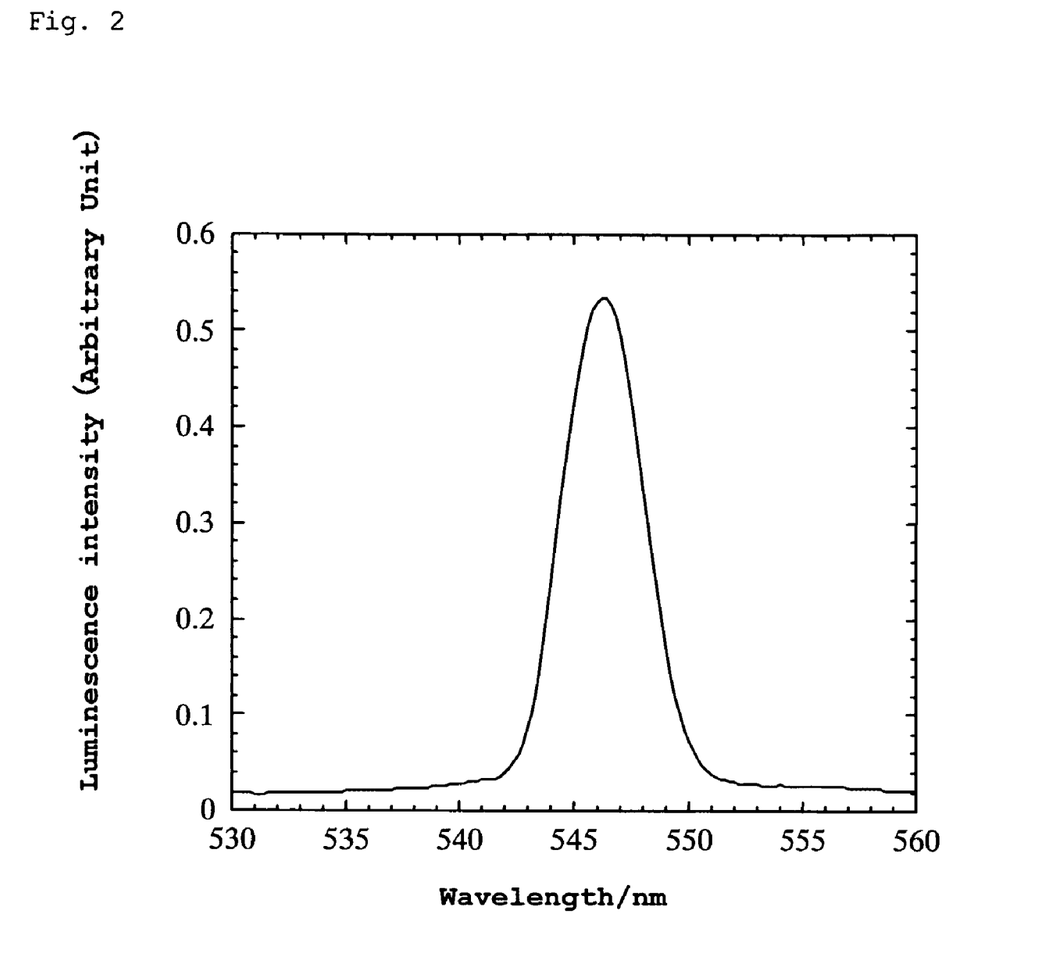
FIG. 2 is a graph showing wavelength characteristics of light emitted from a thin plate prepared in Example 2 of the present invention with an applied bipolar AC voltage having a frequency of 10 Hz, and a voltage of ±800 to 900 V.

A thin plate having a diameter of about 2.1 mm and a thickness of about 0.137 mm was prepared by cutting and abrading 0.1% (mole % of Ti relative to Al) titanium-doped $YAlO_3$ single crystal (translucent with light brown) obtained by an FZ method.

An aluminum electrode layer (cathode) having a thickness of 150 nm was formed on one entire surface of the thin plate by a vacuum deposition method. A semicircular gold electrode layer (anode) having a thickness of 75 nm was formed on half of the other surface of the thin plate by a DC sputtering method.

A platinum wire was attached to the thin plate using silver paste and bipolar high AC voltage was applied thereto. When the AC voltage was varied at a frequency of 10 Hz, green luminescence was generated in the range of ±550 to 900 V. The wavelength at the luminescence peak was 546 nm. (When the frequency was varied at ±500 V, luminescence was observed within the range of 250 to 600 Hz.) Luminescence was also observed until the frequency reached 600 Hz. Luminescence was also observed when high direct current voltage, such as not less than 1500 V, was applied.

Example 3

Figure 3:
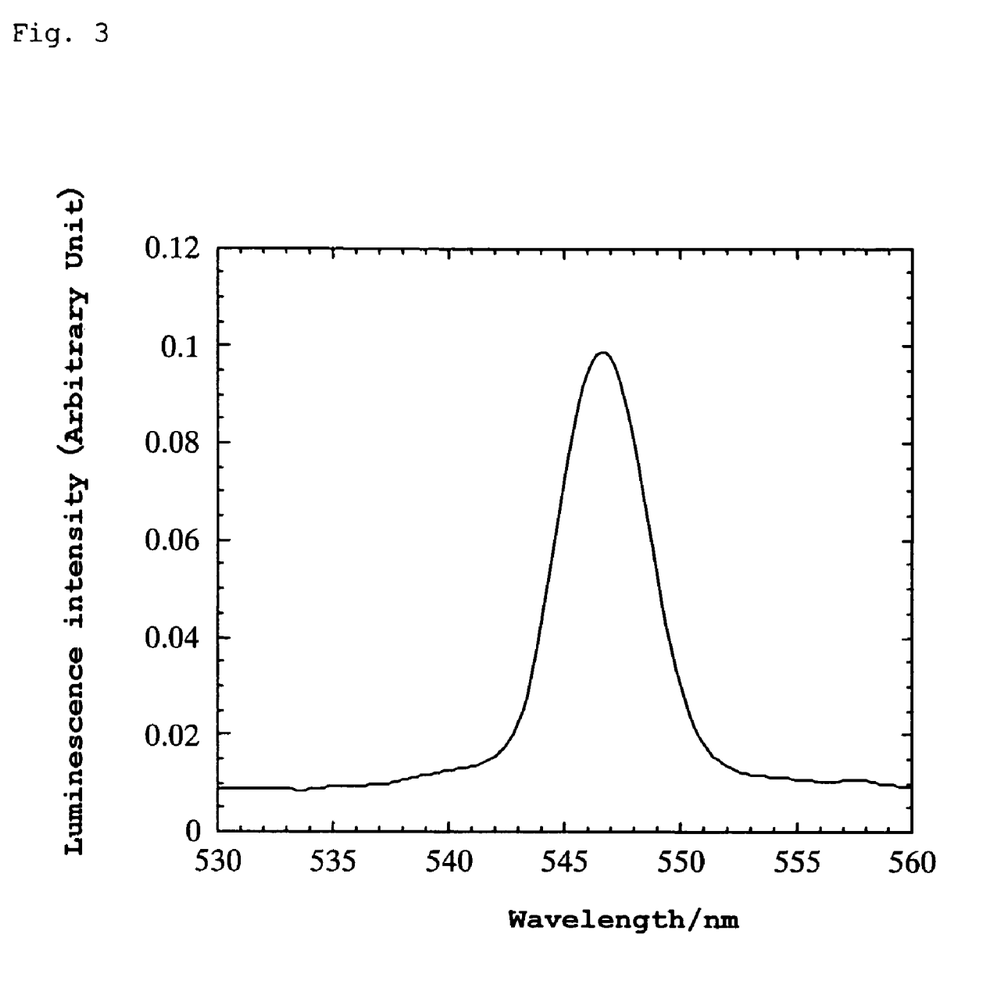
FIG. 3 is a graph showing wavelength characteristics of light emitted from a thin plate prepared in Example 3 of the present invention with an applied bipolar AC voltage having a frequency of 10 Hz, and a voltage of ±275 to 375 V.

A thin plate having a diameter of about 2.1 mm and a thickness of about 0.137 mm was prepared by cutting and abrading 1% (mole % of Ti relative to Al) titanium-doped $YAlO_3$ single crystal (translucent with light yellowish brown) obtained by an FZ method.

An aluminum electrode layer (cathode) having a thickness of 150 nm was formed on one entire surface of the thin plate by a vacuum deposition method. A semicircular gold electrode layer (anode) having a thickness of 75 nm was formed on half of the other surface of the thin plate by a DC sputtering method.

A platinum wire was attached to the thin plate using silver paste and bipolar high AC voltage was applied thereto. When the AC voltage was varied at a frequency of 10 Hz, green luminescence was generated in the range of ±275 to 375 V. The wavelength at the luminescence peak was 547 nm. (When the frequency was varied at ±500 V, luminescence was observed within the range of 2 to 60 Hz.) Luminescence was also observed until the frequency reached 60 Hz. Furthermore, luminescence was observed when high direct current voltage, such as not less than 1500 V, was applied.

Example 4

Figure 4:
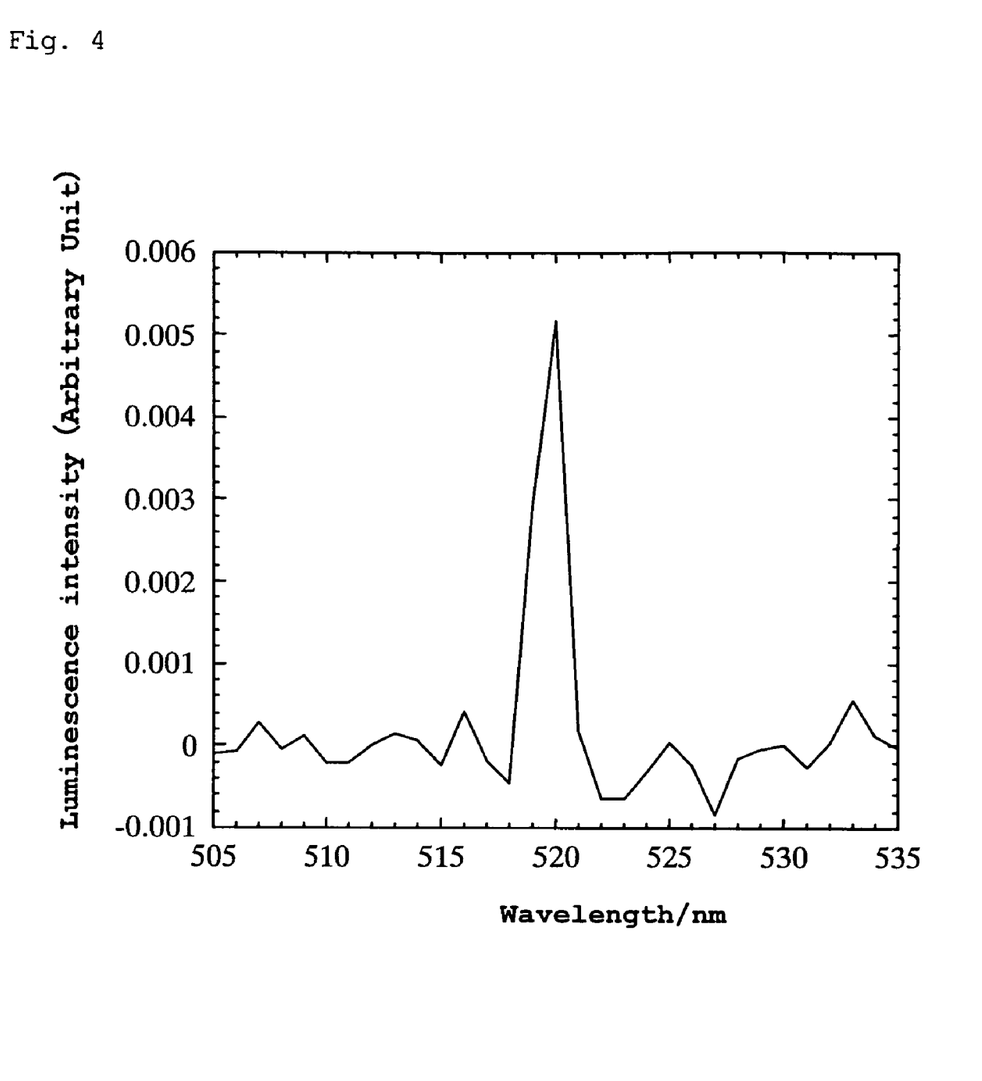
FIG. 4 is a graph showing wavelength characteristics of light emitted from a thin plate prepared in Example 4 of the present invention with an applied bipolar AC voltage having a frequency of 1 MHz, and a voltage of ±10 mV to 1 V.

A thin plate having a diameter of about 2.1 mm and thickness of about 0.198 mm was prepared by cutting and abrading 3% (mole % of Ti relative to Al) titanium-doped $YAlO_3$ single crystal (brown with translucent white) obtained by an FZ method.

An aluminum electrode layer (cathode) having a thickness of 150 nm was formed on one entire surface of the thin plate by a vacuum deposition method. A semicircular gold electrode layer (anode) having a thickness of 75 nm was formed on half of the other surface of the thin plate by a DC sputtering method.

A platinum wire was attached to the thin plate using silver paste and bipolar high AC voltage was applied thereto. As a result, viridian to yellowish green luminescence was generated at a voltage of in the range of ±10 mV to ±1 V, and a frequency in the range of 1 kHz to 5 MHz. When the frequency was varied at ±500 V, white luminescence was observed within the range of 2 to 60 Hz. Luminescence of visible light was also observed when high direct current voltage, such as not less than 1500 V, was applied.

Example 5

A thin plate having a diameter of about 2.1 mm and a thickness of about 0.137 mm was prepared by cutting and abrading 0.1% (mole % of Mg relative to Al) magnesium-doped $LaAlO_3$ single crystal obtained by an FZ method.

An aluminum electrode layer (cathode) having a thickness of 150 nm was formed on one entire surface of the thin plate by a vacuum deposition method. A semicircular gold electrode layer (anode) having a thickness of 75 nm was formed on half of the other surface of the thin plate by a DC sputtering method.

A platinum wire was attached to the thin plate using silver paste and bipolar high AC voltage was applied thereto. As a result, yellowish green luminescence was generated at a frequency of 10 Hz while applying AC voltage within the range of ±500 to 900 V. Luminescence was also observed when high direct current voltage, such as not less than 1500 V, was applied. Similar luminescence was also observed when single crystalline $LaMnO_3$ was used instead of single crystalline $LaAlO_3$.

The invention claimed is:

1. An electroluminescent element comprising an electroluminescent layer formed from an oxide electroluminescent material having a perovskite-type crystal structure represented by a general formula selected from the group consisting of the following general formulas:
    General Formula $RMO_3$, wherein R represents at least one rare-earth element, and M represents Al, Mn or Cr, the oxide further comprising alkali metals dopant;
    General Formula $R_2CuO_4$, wherein R represents at least one rare-earth element; and
    General Formula $RZ_2Cu_3O_6$, wherein R represents at least one rare-earth element, and Z represents at least one alkaline earth metal.

2. An electroluminescent element according to claim 1, wherein the electroluminescent layer is formed from a single-crystalline oxide thin film.

3. An electroluminescent element according to claim 1, wherein the electroluminescent layer is formed from a polycrystalline oxide thin film.

4. An electroluminescent element according to claim 1, wherein the electroluminescent layer is obtained by the compression molding of oxide fine particles, or by forming a paste comprising oxide fine particles into a layer and then drying.

5. An electroluminescent element according to claim 1, wherein the electroluminescent layer is obtained by the compression molding of a mixture of oxide fine particles and a binder, or by forming a paste comprising a mixture of oxide fine particles and a binder into a layer and then drying.

6. An electroluminescent element according to claim 1, wherein the electroluminescent layer is formed by sputtering.

7. An electroluminescent element according to claim 1, wherein the electroluminescent layer is formed by laser ablation.

8. An electroluminescent element according to claim 1, wherein the electroluminescent layer is formed by metal salt thermal decomposition.

9. An electroluminescent element according to claim 1, wherein the electroluminescent layer is formed by metal complex thermal decomposition.

10. An electroluminescent element according to claim 1, wherein the electroluminescent layer is formed by a sol-gel process using an alkoxide.

11. An electroluminescent element according to claim 1, wherein the electroluminescent element further comprises a light reflection layer.

* * * * *